United States Patent
Tsujimoto et al.

(10) Patent No.: US 7,508,087 B2
(45) Date of Patent: Mar. 24, 2009

(54) VEHICLE ELECTRIC-POWER CONVERSION APPARATUS

(75) Inventors: Katsuya Tsujimoto, Tokyo (JP); Noriyuki Wada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 19 days.

(21) Appl. No.: 11/844,484

(22) Filed: Aug. 24, 2007

(65) Prior Publication Data

US 2008/0225565 A1   Sep. 18, 2008

(30) Foreign Application Priority Data

Mar. 13, 2007   (JP) .............................. 2007-063271

(51) Int. Cl.
*H02P 9/04*   (2006.01)
(52) U.S. Cl. .................................. 290/40 C
(58) Field of Classification Search ................ 290/40 C
See application file for complete search history.

(56) References Cited

U.S. PATENT DOCUMENTS

| | | | | |
|---|---|---|---|---|
| 5,705,902 A * | 1/1998 | Merritt et al. | .......... | 318/400.42 |
| 5,998,976 A * | 12/1999 | Steffan | ......................... | 322/10 |
| 6,420,793 B1 * | 7/2002 | Gale et al. | .................... | 290/34 |
| 6,713,888 B2 * | 3/2004 | Kajiura | ...................... | 290/40 F |
| 7,170,263 B2 * | 1/2007 | Yamamoto et al. | ............ | 322/59 |
| 7,202,572 B2 * | 4/2007 | Blumel | ...................... | 290/37 R |
| 7,215,034 B2 * | 5/2007 | Hino et al. | ................ | 290/40 C |
| 7,362,001 B2 * | 4/2008 | Kusumi | ....................... | 290/31 |
| 7,362,002 B2 * | 4/2008 | Kuribayashi et al. | .......... | 290/31 |
| 7,400,104 B2 * | 7/2008 | Sato | ........................... | 318/376 |
| 2004/0232793 A1 * | 11/2004 | Fujita et al. | ............ | 310/156.43 |
| 2006/0279086 A1 * | 12/2006 | Kishibata et al. | .............. | 290/31 |

FOREIGN PATENT DOCUMENTS

JP    2002-218797 A    8/2002

* cited by examiner

*Primary Examiner*—Joseph Waks
(74) *Attorney, Agent, or Firm*—Sughrue Mion, PLLC

(57) ABSTRACT

The objective of the present invention is to obtain a vehicle electric-power conversion apparatus in which high-efficiency rectification operation can be realized, by detecting in real time a change, due to a fluctuation in a load, in a phase at which a switching element is turned on/off and by changing the phase at which the switching element is turned on/off, in response to the change. A diode-on timing and a diode-off timing corresponding to the diode conduction state of a diode connected in parallel with a switching element are detected; the values of rotor-position signals corresponding to the timings are sequentially stored; based on the stored values of rotor-position signals, a switching-element-on timing and a switching-element-off timing are calculated; and based on the timings, a gate command signal for the switching element is created.

18 Claims, 14 Drawing Sheets

VEHICLE ELECTRIC-POWER CONVERSION APPARATUS

BACKGROUND OF THE INVENTION

1. Field of the Invention

The present invention relates to a vehicle electric-power conversion apparatus utilized for a vehicle rotating electric machine equipped in a vehicle such as a motor vehicle.

2. Description of the Related Art

In a vehicle rotating electric machine, a full-wave rectification method is generally employed in which, as a rectification element, a diode is utilized; however, in order to further enhance the efficiency, a rectification method has been utilized in which, as a rectification element, a switching element is utilized so as to reduce a loss in a rectification element.

A vehicle electric-power conversion apparatus has already been proposed in which a switching element is utilized as a rectification element, and the switching element is on/off-controlled, based on the rotation position, of the rotor of a vehicle rotating electric machine, which is detected through a position detection means (e.g., refer to Patent Document 1).

In the case of the conventional apparatus set forth in Patent Document 1 (Japanese Patent Application Laid-Open No. 2002-218797), phase control for the on/off operation of a switching element is performed by use of a position detection means for detecting the rotation position of the rotor of a vehicle rotating electric machine; however, it has been difficult to cope with a case in which, for example, a load fluctuation causes the original mechanical rotation position corresponding to a phase at which the switching element has to be turned on/off to vary in real time.

SUMMARY OF THE INVENTION

The present invention has been implemented in consideration of the foregoing problem in a conventional apparatus; the objective of the present invention is to obtain a vehicle electric-power conversion apparatus in which high-efficiency rectification operation can be realized, by detecting in real time a change, due to a load fluctuation, in a phase at which a switching element is turned on/off and changing the phase at which the switching element is turned on/off, in response to the change.

An electric-power conversion apparatus according to the present invention is configured in such a way as to include an electric-power conversion unit, having a plurality of switching elements each connected between an armature winding of a rotating electric machine equipped in a vehicle and a DC load and a plurality of diodes each connected in parallel with a corresponding switching element, for performing electric-power conversion between the rotating electric machine and the DC load, by means of switching operation of the plurality of switching elements; a diode-conduction-state detection unit for detecting diode-on timings and diode-off timings corresponding to conduction states of at least one of the plurality of diodes in the case where the rotating electric machine is in electric-power generating operation and the plurality of switching elements are off; and a gate-command creation Unit for creating gate command signals for the plurality of switching elements, based on the diode-on timings and the diode-off timings detected by the diode-conduction-state detection unit, and for feeding the gate command signals to the plurality of switching elements, and in such a way that the electric-power conversion is performed by means of switching operation, of the plurality of switching elements, in accordance with the gate command signals.

Moreover, an electric-power conversion apparatus according to the present invention is configured in such a way as to include an electric-power conversion unit, having a plurality of switching elements each connected between an armature winding of a rotating electric machine equipped in a vehicle and a DC load and a plurality of diodes each connected in parallel with a corresponding switching element, for performing electric-power conversion between the rotating electric machine and the DC load, by means of switching operation of the plurality of switching elements; a diode-conduction-state detection unit for detecting diode-on timings and diode-off timings corresponding to conduction states of at least one of the plurality of diodes in the case where the rotating electric machine is in electric-power generating operation and the plurality of switching elements are off; a rotor-position detection unit for generating a rotor-position signal corresponding to the position of the rotor of the rotating electric machine; a timing processing unit for sequentially storing the values of the rotor-position signals each corresponding to the detected diode-on and the detected diode-off timing and for calculating switching-element-on timings and switching-element-off timings for the plurality of switching elements; and a gate-command creation Unit for creating gate command signals for the plurality of switching elements, based on the switching-element-on timings and the switching-element-off timings calculated by the timing processing unit, and for feeding the gate command signals to the plurality of switching elements, and in such a way that the electric-power conversion is performed by means of switching operation, of the plurality of switching elements, in accordance with the gate command signals.

In the present invention, a DC load includes a secondary battery that is charged by an electric-power conversion apparatus to accumulate DC energy and supplies electric power to various kinds of electric apparatuses or electronic apparatuses equipped in a vehicle.

An electric-power conversion apparatus according to the present invention is configured in such a way as to include a diode-conduction-state detection unit for detecting diode-on timings and diode-off timings corresponding to conduction states of at least one of the plurality of diodes in the case where the rotating electric machine is in electric-power generating operation and the plurality of switching elements are off; and a gate-command creation Unit for creating gate command signals for the plurality of switching elements, based on the diode-on timings and the diode-off timings detected by the diode-conduction-state detection unit, and for feeding the gate command signals to the plurality of switching elements, and in such a way that the electric-power conversion is performed by means of switching operation, of the plurality of switching elements, in accordance with the gate command signals; therefore, control of the switching elements can be performed without being affected by a load fluctuation, whereby a high-reliability vehicle electric-power conversion apparatus can be obtained with a simple configuration.

Moreover, an electric-power conversion apparatus according to the present invention is configured in such a way as to include a diode-conduction-state detection unit for detecting diode-on timings and diode-off timings corresponding to conduction states of at least one of the plurality of diodes in the case where the rotating electric machine is in electric-power generating operation and the plurality of switching elements are off; and a rotor-position detection unit for generating a rotor-position signal corresponding to the position of the rotor of the rotating electric machine; a timing processing unit for sequentially storing the values of the rotor-position signals each corresponding to the detected diode-on and the detected diode-off timing and for calculating switching-element-on timings and switching-element-off timings for the plurality of switching elements; and a gate-command creation Unit for creating gate command signals for the plurality of switching elements, based on the switching-element-on timings and the switching-element-off timings calculated by the timing processing unit, and for feeding the gate command signals to the plurality of switching elements, and in such a way that the electric-power conversion is performed by means of switching operation, of the plurality of switching elements, in accordance with the gate command signals; therefore, control of the switching elements can more stably be performed without being affected by a load fluctuation, whereby a further high-reliability vehicle electric-power conversion apparatus can be obtained with a simple configuration.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
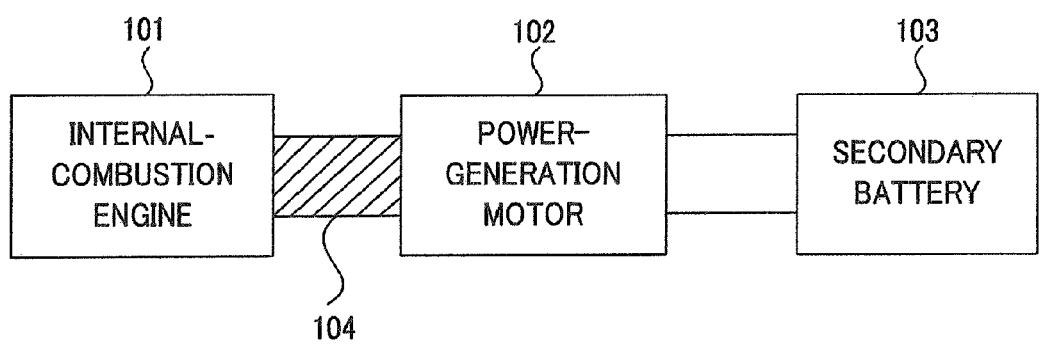
FIG. 1 is an explanatory diagram for a vehicle system utilizing a power-generation motor.
Figure 2:
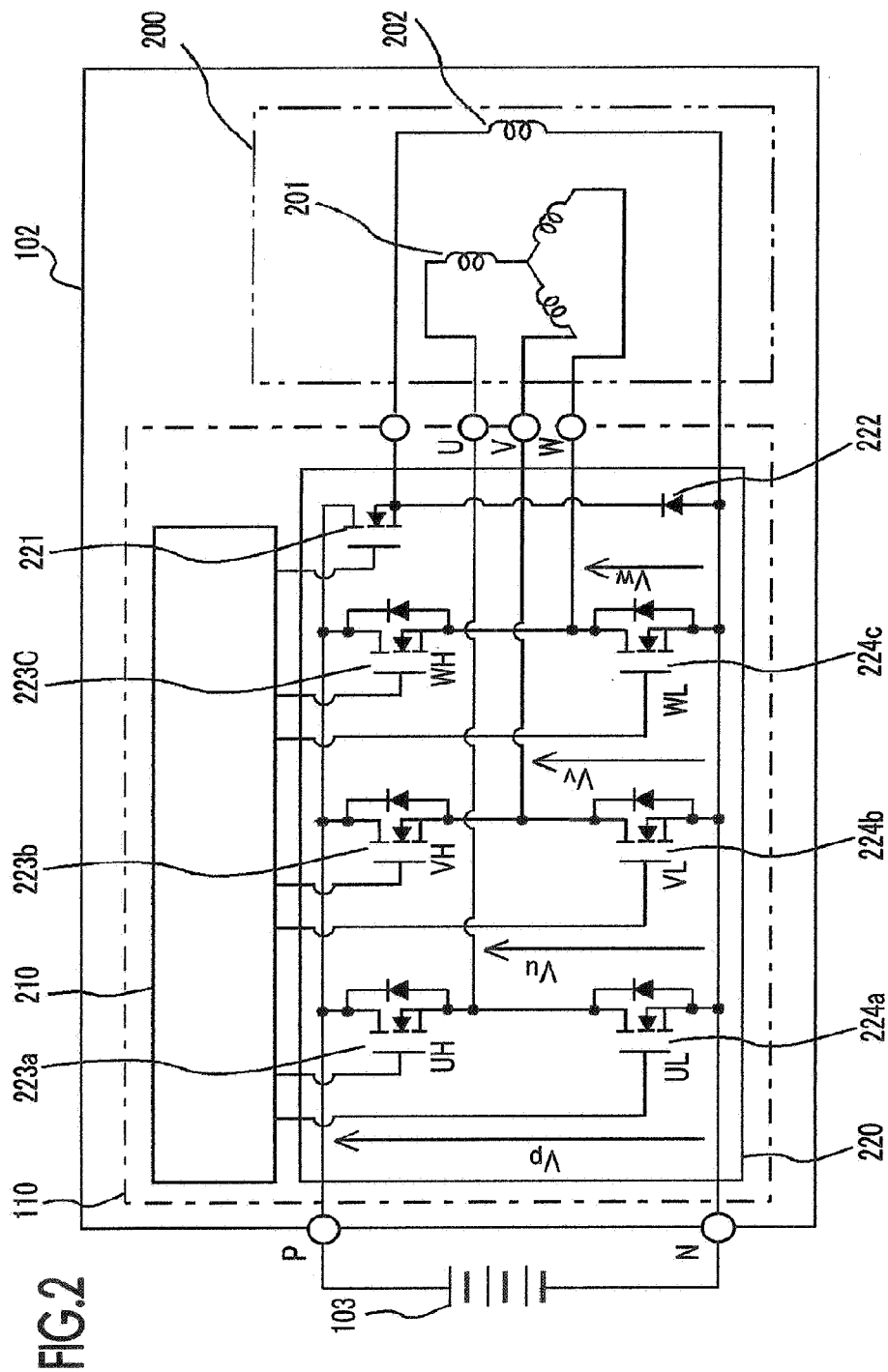
FIG. 2 is a configuration diagram illustrating the configuration of an electric generator including a vehicle electric-power conversion apparatus according to Embodiment 1 of the present invention.
Figure 3:
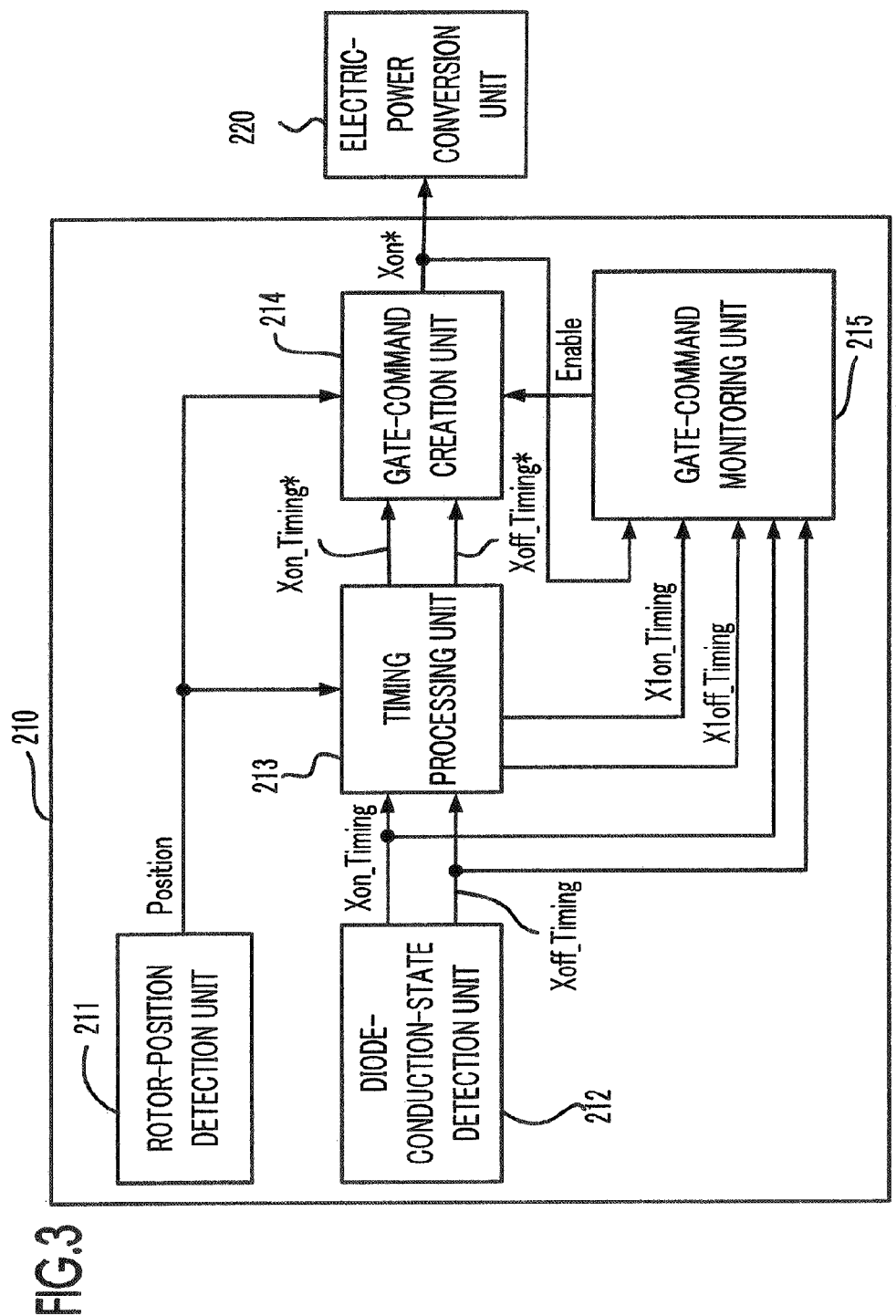
FIG. 3 is a block diagram illustrating the configuration of a gate control unit in a vehicle electric-power conversion apparatus according to Embodiment 1 of the present invention.

A vehicle electric-power conversion apparatus according to Embodiment 1 of the present invention will be explained in detail below. FIG. 1 is an explanatory diagram for a vehicle system in which, as a rotating electric machine, a power-generation motor is utilized; FIG. 2 is a configuration diagram illustrating the configuration of a power-generation motor including a vehicle electric-power conversion apparatus according to Embodiment 1 of the present invention; and FIG. 3 is a block diagram illustrating the configuration of the gate control unit in a vehicle electric-power conversion apparatus according to Embodiment 1 of the present invention. In FIG. 1, a power-generation motor 102 as a vehicle rotating electric machine is driven by an internal-combustion engine 101, by way of a power transmission means 104 such as a belt, so as to generate electric power, i.e., AC energy. During the operation of the internal-combustion engine 101, the AC energy generated by the power-generation motor 102 is converted by a power conversion apparatus into DC energy and accumulated in a secondary battery 103.

As illustrated in FIG. 2, the power-generation motor 102 is configured with a vehicle electric-power conversion apparatus 110 according to Embodiment 1 of the present invention and a motor-generator unit 200. The vehicle electric-power conversion apparatus 110 includes a electric-power conversion unit 220 and a gate Control Unit 210 that performs on-off control of switching elements. The electric-power conversion unit 220 includes a magnetic-field switching element 221 for performing PWM (Pulse Width Modulation)-control of a magnetic-field current; a free-wheel diode 222 connected in series to the switching element 221; a U-phase upper-arm switching element (referred to as UH, hereinafter) 223a; a V-phase upper-arm switching element (referred to as VH, hereinafter) 223b; a W-phase upper-arm switching element (referred to as WH, hereinafter) 223c; a U-phase lower-arm switching element (referred to as UL, hereinafter) 224a; a V-phase lower-arm switching element (referred to as VL, hereinafter) 224b; and a W-phase lower-arm switching element (referred to as WL, hereinafter) 224c.

UH 223a, VH 223b, WH 223c, UL 224a, VL 224b, and WL 224c each incorporate a parasitic diode. The parasitic diodes incorporated in UH 223a, VH 223b, WH 223c, UL 224a, VL 224b, and WL 224c are referred to as UH diode, VH diode, WH diode, UL diode, VL diode, and WL diode, respectively.

UH 223a, VH 223b, WH 223c, UL 224a, VL 224b, and WL 224c configure a 3-phase bridge circuit; the connection point, situated at the AC side of the 3-phase bridge circuit, between UH 223a and UL 224a is connected to the U-phase terminal of the motor-generator unit 200; the connection point between VH 223b and VL 224b is connected to the V-phase terminal of the motor-generator unit 200; the connection point between WH 223c and WL 224c is connected to the W-phase terminal of the motor-generator unit 200. A positive-polarity terminal P, which is the common connection portion among UH 223a, VH 223b, and WH 223c and situated at the DC side of the 3-phase bridge circuit, is connected to the positive-polarity terminal of the battery 103; a negative-polarity terminal N, which is the common connection portion among UL 224a, VL 224b, and WL 224c, is connected to the negative-polarity terminal of the battery 103. The potential of the negative-polarity terminal N is equal to the ground potential of the vehicle.

In addition, in FIG. 2, as the motor-generator unit 200, a 3-phase magnetic-field-winding power-generation motor having a 3-phase armature winding 201 provided in the stator and a magnetic-field winding 202 provided in the rotor is utilized; however, it goes without saying that the number of phases may be other than three, and other magnetic-field systems such as a permanent-magnet system may be utilized. Furthermore, not being limited to the integrated-structure power-generation motor 102 in which, as illustrated in FIG. 2, the vehicle electric-power conversion apparatus 110 and the motor-generator unit 200 are integrally incorporated, a separated-structure power-generation-motor system in which the vehicle electric-power conversion apparatus 110 and the motor-generator unit 200 are physically separated may be utilized.

The gate control Unit 210 performs on-off-command control of UH 223a, VH 223b, WH 223c, UL 224a, VL 224b, and WL 224c. As illustrated in FIG. 3, the gate control Unit 210 is configured with a rotor-position detection unit 211, a diode-conduction-state detection unit 212, a timing processing unit 213, a gate-command creation Unit 214, and a gate-command monitoring unit 215.

The rotor-position detection unit 211 detects in real time the position of the rotor of the motor-generator unit 200, by use of, for example, a resolver, a hole element, or the like, and detects a rotor-position signal "Position". The diode-conduction-state detection unit 212 is a means for detecting the conduction states of respective diodes connected in parallel with UH 223a, VH 223b, WH 223c, UL 224a, VL 224b, and WL 224c; when a forward current flows through the diode and a forward voltage Vf is generated across the diode, the diode-conduction-state detection unit 212 detects the "diode-on state"; when no forward current flows through the diode, whereby both end terminals are disconnected and no forward voltage Vf is generated, the diode-conduction-state detection unit 212 detects the "diode-off state".

With the potential of the negative-polarity terminal N of the electric-power conversion unit 220 taken as a reference, letting Vp denote the voltage of the positive-polarity terminal P (referred to as a positive-polarity terminal voltage, hereinafter) and letting Vu, Vv, and Vw denote the voltages of 3-phase terminals U, V, and W, respectively, the respective diode-on timings of the upper-arm switching elements UH 223a, VH 223b, and WH 223c can be detected by the rotor-position detection unit 211, based on the following determination equations:

Determination equation for detecting UH-diode-on state:

$$Vp \leq Vu \leq Vp + Vf \quad \text{(Equation 1)}$$

Determination equation for detecting VH-diode-on state:

$$Vp \leq Vv \leq Vp + Vf \quad \text{(Equation 2)}$$

Determination equation for detecting WH-diode-on state:

$$Vp \leq Vw \leq Vp + Vf \quad \text{(Equation 3)}$$

Additionally, the respective diode-off timings of UH 223a, VH 223b, and WH 223c can be detected by the rotor-position detection unit 211, based on the following determination equations:

Determination equation for detecting UH-diode-off state:

$$Vu < Vp \quad \text{(Equation 4)}$$

Determination equation for detecting VH-diode-off state:

$$Vv < Vp \quad \text{(Equation 5)}$$

Determination equation for detecting WH-diode-off state:

$$Vw < Vp \quad \text{(Equation 6)}$$

The respective diode-on timings of the lower-arm switching elements UL 224a, VL 224b, and WL 224c can be detected by the rotor-position detection unit 211, based on the following determination equations:

Determination equation for detecting UL-diode-on state:

$$-Vf \leq Vu \leq 0 \quad \text{(Equation 7)}$$

Determination equation for detecting VL-diode-on state:

$$-Vf \leq Vv \leq 0 \quad \text{(Equation 8)}$$

Determination equation for detecting WL-diode-on state:

$$-Vf \leq Vw \leq 0 \quad \text{(Equation 9)}$$

On the other hand, the respective diode-off timings of UL 224a, VL 224b, and WL 224c can be detected by the rotor-position detection unit 211, based on the following determination equations:

Determination equation for detecting UL-diode-off state:

$$0 < Vu \quad \text{(Equation 10)}$$

Determination equation for detecting VL-diode-off state:

$$0 < Vv \quad \text{(Equation 11)}$$

Determination equation for detecting WL-diode-off state:

$$0 < Vw \quad \text{(Equation 12)}$$

Figure 4:
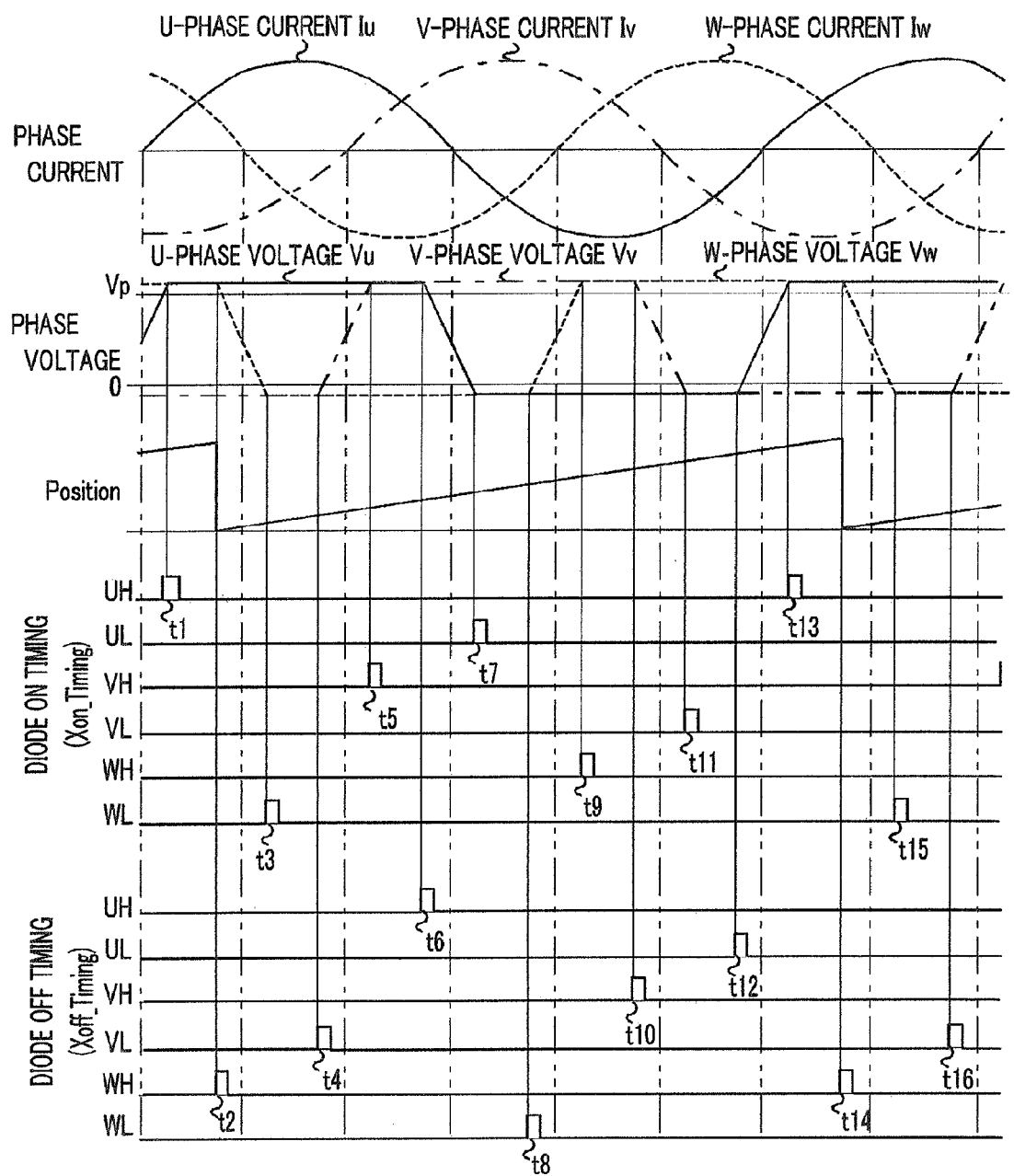
FIG. 4 is a timing chart for explaining the operation of a diode-conduction-state detection unit of a vehicle electric-power conversion apparatus according to Embodiment 1 of the present invention.

FIG. 4 is a timing chart for explaining the operation of the diode-conduction-state detection unit in the case where none of the switching elements is switching-controlled. In FIG. 4, in the case where the relationships as represented in FIG. 4 are made between the U-phase current Iu and the U-phase voltage Vu, between the V-phase current Iv and the V-phase voltage Vv, and between the W-phase current Iw and the W-phase voltage Vw, UH diode is turned on at the timing t1 when the U-phase voltage Vu reaches the value satisfying Equation 1 with respect to the positive-polarity terminal voltage Vp, and the diode-conduction-state detection unit 212 detects the on-state of UH diode at the timing t1.

WH diode is turned off at the timing t2 when the W-phase voltage Vw reaches the value satisfying Equation 6 with respect to the positive-polarity terminal voltage Vp, and the diode-conduction-state detection unit 212 detects the off-state of WH diode at the timing t2. WL diode is turned on at the timing t3 when the W-phase voltage Vw becomes below zero and reaches the value satisfying Equation 9, and the diode-conduction-state detection unit 212 detects the on-state of WL diode at the timing t3.

Similarly, VH diode, UL diode, WH diode, and VL diode are turned on at the timings t5, t7, t9, and t11, respectively, and the diode-conduction-state detection unit 212 detects the respective on-states of the VH diode, UL diode, WH diode, and VL diode at the timings t5, t7, t9, and t11; additionally, VL diode, UH diode, WL diode, VH diode, and UL diode are turned off at the timings t4, t6, t8, t10, and t12, respectively, and the diode-conduction-state detection unit 212 can detect the respective off-states of the VL diode, UH diode, WL diode, VH diode, and UL diode at the timings t4, t6, t8, t10, and t12, respectively.

In embodiment 1, as represented in FIG. 4, the rotor-position signal "Position" from the rotor-position detection unit 211 is a signal whose value increases around the electric angle of 360°, based on the rotor position between the timing t2 and the timing t14, and this behavior is repeated every electric angle of 360°; the position of the rotor can be determined through the value of the rotor-position signal.

In the case of Embodiment 1 of the present invention, the diode-conduction-state detection unit 212 detects, based on Equations 1 to 12, the respective on-timings and respective off-timings of the diodes connected in parallel with the corresponding switching elements, outputs the diode on-timing signal Xon_Timing at the timings t1, t3, t5, t7, t9, and t11, generates the diode off-timing signal Xoff_Timing at the timings t2, t4, t6, t8, t10, and t12, and inputs the diode on-timing signal and the diode off-timing signal to the timing processing unit 213 and the gate-command monitoring unit 215 described later.

The timing processing unit 213 receives from the diode-conduction-state detection unit 212 each of the diode on-timing signals Xon_Timing and each of the diode off-timing signals Xoff_Timing, and stores the respective values of the rotor-position signals "Position" corresponding to the diode-on timings t1, t3, t5, t7, t9, and t11 and the diode-off timings t2, t4, t6, t8, t10, and t12.

Additionally, the timing processing unit 213 presumes that the timings at which respective on-ensuring times, described later, for the switching elements have passed after the on-timings t1, t3, t5, t7, t9, and t11, of the upper diodes, obtained as described above, are the on-timings of the switching elements, and then outputs switching-element on-timing signals Xon_Timing*; additionally, based on the rotor-position signals "Position" that have most recently been stored, the timing processing unit 213 presumes that the timings that are respective off-ensuring times before the diode-off timings t2, t4, t6, t8, t10, and t12 are the off-timings of the switching elements, and then outputs switching-element off-timing signals Xoff_Timing*; the timing processing unit 213 inputs each of these signals to the gate-command creation Unit 214 and, at the same timing, inputs to the gate-command monitoring unit 215 a monitoring on-timing signal X1on_Timing and a monitoring off-timing signal X1off_Timing.

In addition, the actual off-timings of the diodes are the timings at which phase voltages Vu, Vv, and Vw become below the positive-polarity terminal voltage Vp by a predetermined value; however, in FIG. 4, the off-timings of the diodes are represented, with the hysteresis characteristics neglected, for simplicity.

Based on the switching-element on-timing signal Xon_Timing* and the switching-element off-timing signal Xoff_Timing*, which have been presumption-calculated by the timing processing unit 213, and the rotation-position signal "position" from the rotor-position detection unit 211, the gate-command creation Unit 214 creates a gate command signal Xon* for each of UH 223a, VH 223b, WH 223c, UL 224a, VL 224b, and WL 224c and inputs the gate command signal Xon* to the gate of each switching element.

Figure 5:
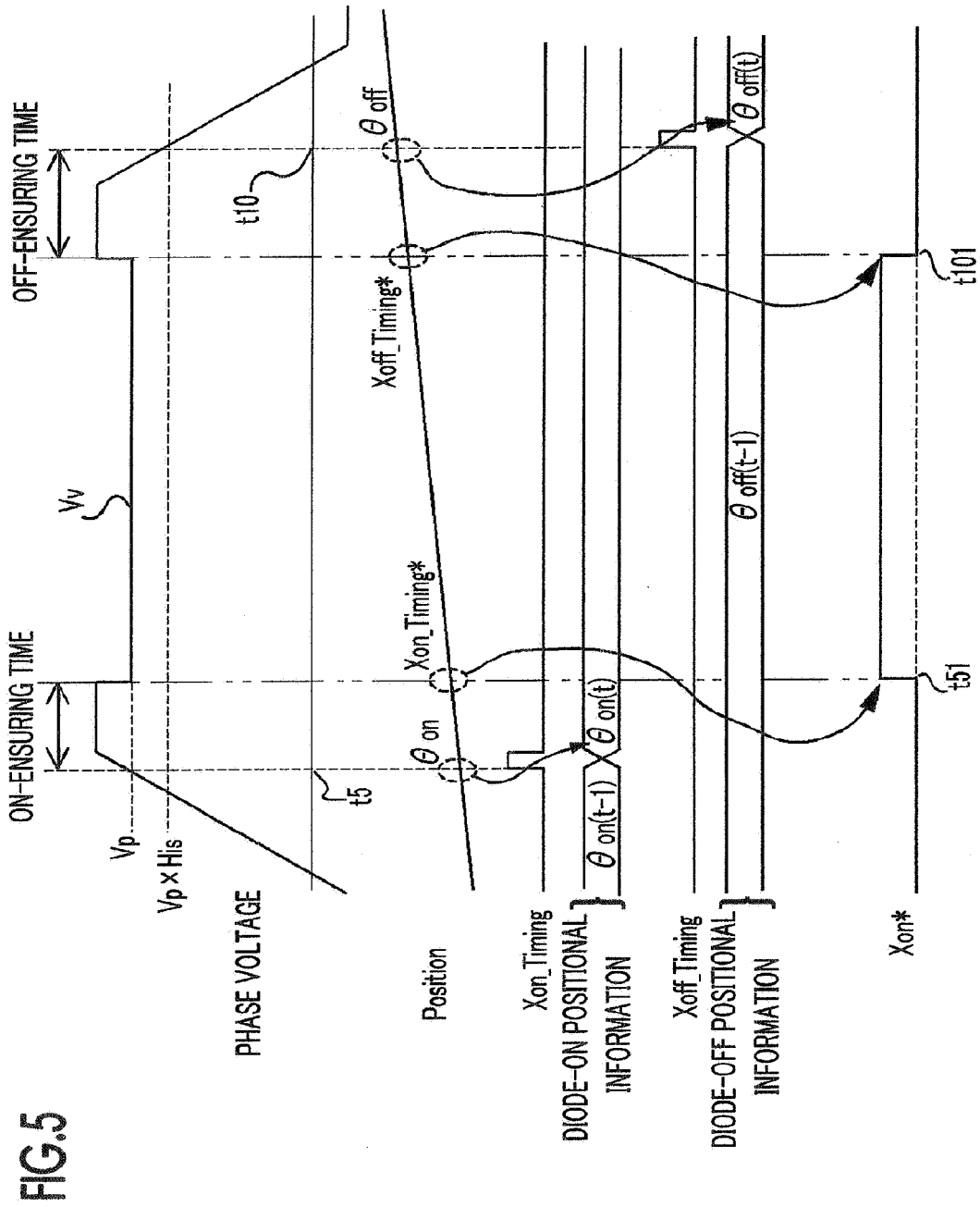
FIG. 5 is a timing chart for explaining the operation of a gate-command creation Unit of a vehicle electric-power conversion apparatus according to Embodiment 1 of the present invention.

FIG. 5 is a detailed timing chart representing, as an example, a method in which the gate command signal Xon* for the upper-arm switching element VH 223b is created by the gate-command creation Unit 214. In FIG. 5, the diode-conduction-state detection unit 212 outputs the diode on-timing signal Xon_Timing at the timing t5, as described above, when the V-phase voltage Vv exceeds the positive-polarity terminal voltage Vp, and inputs the diode on-timing signal Xon_Timing to the timing processing unit 213.

The timing processing unit 213 stores the value θon(t) of the rotor-position signal "Position" at the timing t5 when the diode on-timing signal Xon_Timing is inputted, generates the switching-element on-timing signal Xon_Timing* at the timing t51 corresponding to the timing obtained by adding the on-ensuring time (angle) to the timing t5, and inputs the switching-element on-timing signal Xon_Timing* to the gate-command creation Unit 214. The gate-command creation Unit 214 generates the gate command signal Xon* at the timing t51 when the switching-element on-timing signal Xon_Timing* is inputted, and feeds the switching-element on-timing signal Xon_Timing* to the gate of VH 223b so as to turn on VH 223b.

Next, the diode-conduction-state detection unit 212 outputs the diode off-timing signal Xoff_Timing at the timing t10 when the V-phase voltage Vv decreases down to the value obtained by subtracting a hysteresis voltage value [Vp×His] from the positive-polarity terminal voltage Vp, and inputs the diode off-timing signal Xoff_Timing to the timing processing unit 213. The timing processing unit 213 sequentially stores the value θoff (t) of the rotor-position signal "Position" each time the diode off-timing signal Xoff_Timing is inputted; the timing processing unit 213 generates the switching-element off-timing signal Xoff_Timing* at the timing t101 when the value of the rotor-position signal "Position" reaches the value θoff (t−1) obtained by subtracting the value corresponding to the off-ensuring time (angle) for VH 223b from the value θoff(t) of the rotor-position signal "Position" that has most recently been stored, and inputs the switching-element off-timing signal Xoff_Timing* to the gate-command creation Unit 214.

The gate-command creation Unit 214 stops the gate command signal Xon* at the timing t101 when the switching-element off-timing signal Xoff_Timing* is inputted, thereby rendering VH 223b non-conductive. VH 223b becomes non-conductive at the timing t101 and only VH diode remains conductive; as represented in FIG. 4 described above, the diode-conduction-state detection unit 212 can detect the off-state of VH 223b and diode off-timing signal Xoff_Timing at the timing t10.

In addition, in FIG. 5, a case in which the upper-arm switching elements are exemplified by VH 223b has been explained; however, by, in accordance with the same method as described above, making the gate-command creation Unit 214 generate and stop the gate command signals Xon*, the upper-arm switching elements UH 223a and WH 223c and the lower-arm switching elements UL224a, VL224b, and WL224c can also be on-off controlled.

Figure 6:
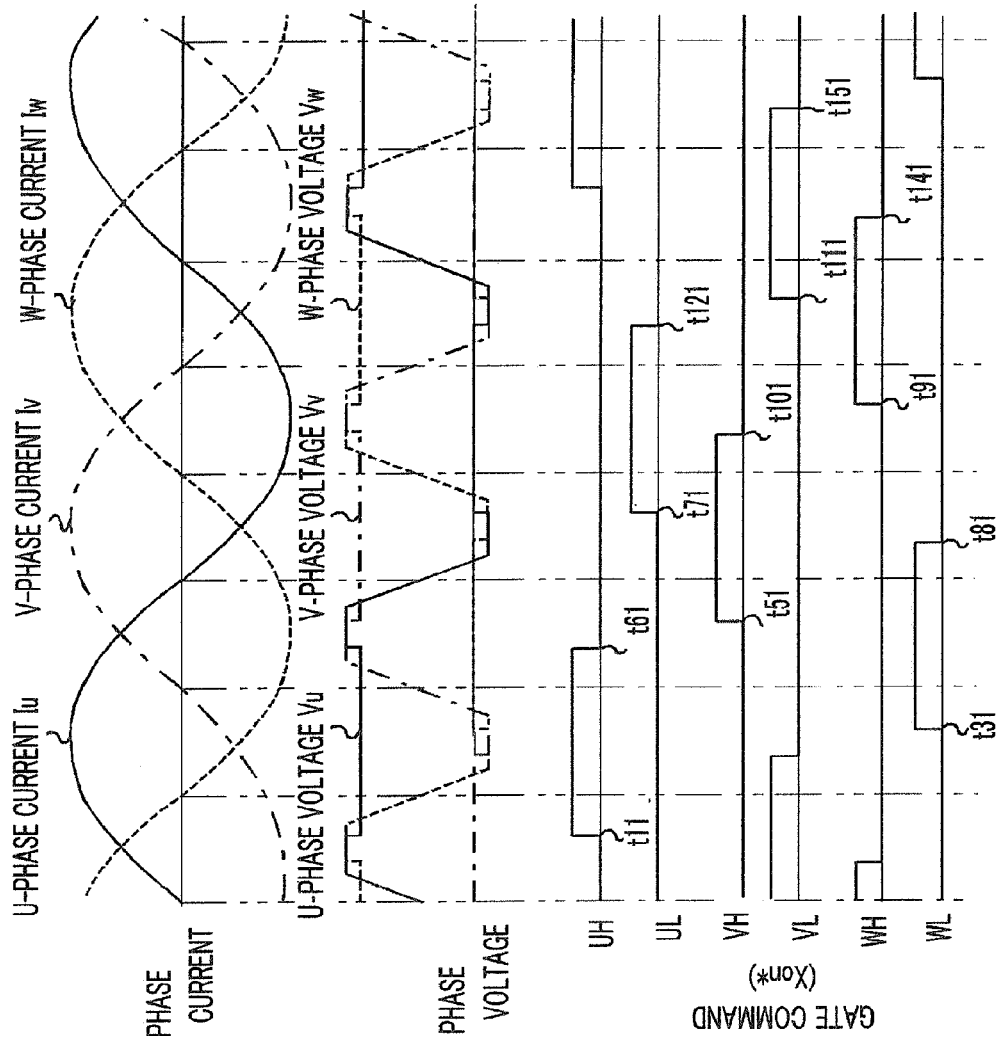
FIG. 6 is a timing chart for explaining the operation of a switching element of a vehicle electric-power conversion apparatus according to Embodiment 1 of the present invention.

FIG. 6 is a timing chart representing a case in which switching control of UH 223a, VH 223b, WH 223c, UL 224a, VL 224b, and WL 224c is performed through the gate command signals Xon* described in the explanation with reference to FIG. 5. That is to say, in FIG. 6, UH 223a becomes conductive at the timing t11 and then non-conductive at the timing t61; as described above, VH 223b becomes conductive at the timing t51 and then non-conductive at the timing t101; WH 223c becomes conductive at the timing t91 and then non-conductive at the timing t141. Additionally, UL 224a becomes conductive at the timing t71 and then non-conductive at the timing t121; VL 224b becomes conductive at the timing t111 and then non-conductive at the timing t151; WL 224c becomes conductive at the timing t81 and then non-conductive at the timing t81.

Returning to FIG. 3, the diode on-timing signal Xon_Timing and the diode off-timing signal Xoff_Timing from the diode-conduction-state detection unit 212, the monitoring on-timing signal X1on_Timing and the monitoring off-timing signal X1off_Timing from timing processing unit 213, and the gate command signal Xon* from the gate-command creation Unit 214 are inputted to the gate-command monitoring unit 215. Based on these input signals, the gate-command monitoring unit 215 monitors the signal generation timing of the gate command signal Xon*. Next, the method of monitoring, by the gate-command monitoring unit 215, of the signal generation timing of the gate command signal Xon* will be explained.

In general, when the synchronous rectification is correctly performed, the switching-element on-timing signal Xon_Timing* is generated, as described above, at the timing when the on-ensuring time (angle)for the switching element has passed from the on-timing of the corresponding one of UH to WL diodes, and then the gate command signal Xon* becomes "on". In contrast, in the case of the "off" operation, the switching-element off-timing signal Xoff_Timing* is generated at the timing t101 when the rotor-position signal "Position" reaches the value that has been stored in the most recent operation, and then the gate command signal Xon* becomes "off". After that, the diode off-timing signal Xoff_Timing is generated at the timing t10 when the off-ensuring time (angle) for the switching element has passed from the timing t101.

Figure 7:
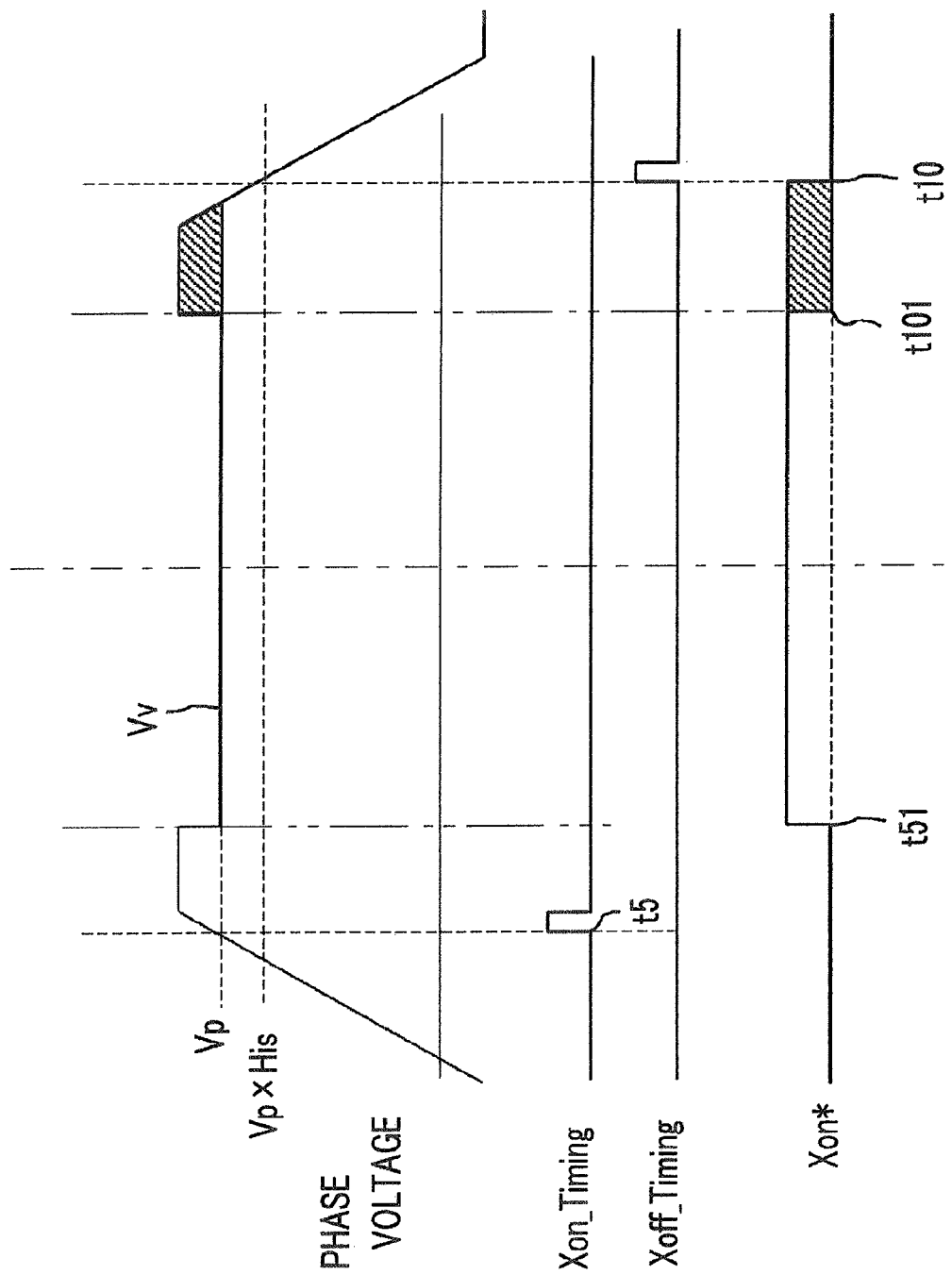
FIG. 7 is a timing chart representing the operation of monitoring a gate command signal for a vehicle electric-power conversion apparatus according to Embodiment 1 of the present invention.

However, in the case where, as represented in FIG. 7, due to some contributing factors, the timing when the gate command signal Xon* becomes "off" is delayed from t101, which is the original timing, up to t10, the off-ensuring for the switching element is not correctly performed, whereby the diode off-timing signal Xoff_Timing is generated immediately after the timing t10 when the gate command signal Xon* becomes "off", without involving a time in which the off-ensuring time (angle) passes. In addition, in the case where, even though not delayed up to the timing t10, the off-timing of the gate command signal Xon* falls within a time period between the original timing t101 and the timing t10 (timing within the hatched area in FIG. 8), the time between the delayed timing and the timing t10 when the diode off-timing signal Xoff_Timing is generated is eventually shorter than the original off-ensuring time for the switching element.

As described above, in the case where the off-timing of the gate command signal Xon* is delayed, especially, as represented in FIG. 7, up to the timing t10, the diode off-timing signal Xoff_Timing emerges at the same time that the gate command signal Xon* becomes "off", whereby it is impossible to determine whether the gate command signal Xon* is generated correctly.

Similarly, in the case where, as represented in FIG. 7, due to some contributing factors, the timing when the gate command signal Xon* becomes "on" is extremely accelerated from t51, which is the original timing, up to t5, the gate command signal Xon* becomes "on", without involving any time in which the on-ensuring time (angle) passes, at the same time that the diode on-timing signal Xon_Timing is generated; therefore, the on-ensuring for the switching element is not correctly performed.

Thus, in order to avoid these circumstances, the gate-command monitoring unit 215 compares the on-timing and the off-timing of the actual gate command signal Xon* with the monitoring on-timing signal X1on_Timing and the monitoring off-timing signal X1off_Timing inputted from the timing processing unit 213 so as to monitor whether or not the on-timing of the gate command signal Xon* appears definitely after the on-ensuring time (angle) for the switching element has passed from the occurrence of the diode on-timing signal Xon_Timing and whether or not the diode off-timing signal Xoff_Timing occurs after the off-ensuring time for the switching element has passed from the off-timing of the gate command signal Xon*; in the case where the foregoing relationships are negated, the gate-command monitoring unit 215 instantaneously feeds a gate-on-operation prohibition signal "Enable" to the gate-command creation Unit 214 so as to prohibit the gate-on operation of the switching element.

In general, in the case where a rotating electric machine is loaded, the rotation position of the rotor at the timing when each of the diodes connected in parallel with the switching elements becomes conductive varies depending on the rotation speed of the rotating electric machine and how large the load is; however, as described above, the values of the rotor-position signals corresponding to the diode-on timing when the diode becomes conductive and the diode-off timing when the diode becomes non-conductive are sequentially stored, and based on the timings calculated from the stored values, on-off control of the gate command signals Xon* for the upper-arm switching elements UH 223, VH 223b, and WH 223c and the lower-arm switching elements UL 224a, VL 224b, and WL 224c is performed; therefore, on-off control, of the switching elements, insusceptible to load fluctuation can readily be performed, whereby a vehicle electric-power conversion apparatus that enables high-efficiency and high-reliability power-generation operation can be realized.

The gate-command monitoring unit can monitor at least one of the diode-on timing and the diode-off timing so as to prohibit the switching operation of the switching element when detecting the abnormality of the timing.

Moreover, the gate-command monitoring unit can monitor a first relationship in which the diode-on timing exists before the gate command signal and a second relationship in which the diode-off timing exists after the gate command signal, so as to prohibit the switching operation of the switching element when at least one of the relationships are negated.

In a vehicle electric-power conversion apparatus according to Embodiment 1 of the present invention, the diode-conduction-state detection unit 212 detects the diode-on timing when each of all the diodes provided in the upper and lower arms of the power conversion unit becomes conductive and the diode-off timing when each of all the diodes provided in the upper and lower arms of the power conversion unit becomes non-conductive; therefore, a vehicle electric-power conversion apparatus having high diode-conduction-state detection accuracy and high reliability can be obtained.

Embodiment 2

In the case of Embodiment 1 described above, the diode-conduction-state detection unit 212 detects respective on-timings and respective off-timings of all the switching diodes and outputs a diode on-timing signal Xon_Timing at each of on-timings t1, t3, t5, t7, t9, and t11 and a diode off-timing signal Xoff_Timing at each of off-timings t2, t4, t6, t8, t10, and t12.

The diode-on timings and the diode-off timings of lower-arm UL diode, VL diode, and WL diode can be presumed from the diode-on timings and the diode-off timings of the upper-arm diodes; therefore, in a vehicle electric-power conversion apparatus according to Embodiment 2 of the present invention, a diode-conduction-state detection unit 212 actually detects the diode-on timings and the diode-off timings of only upper-arm UH diode, VH diode, and WH diode for phases, U, V, and W, respectively, and based on these timings, presumes the diode-on timings and the diode-off timings of the lower-arm UL diode, VL diode, and WL diode.

Figure 8:
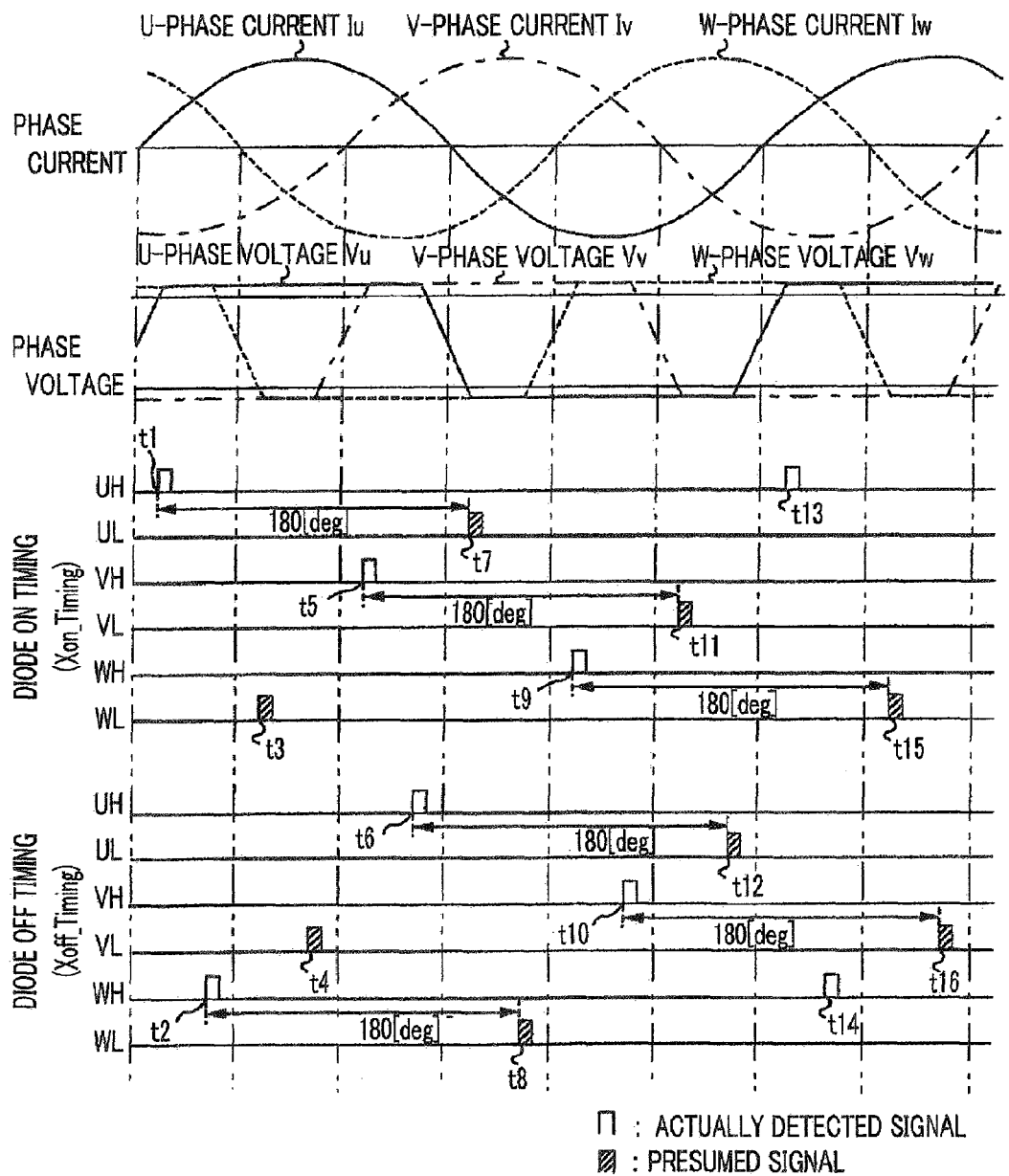
FIG. 8 is a timing chart for explaining the operation of a diode-conduction-state detection unit of a vehicle electric-power conversion apparatus according to Embodiment 2 of the present invention.

FIG. 8 is a timing chart for explaining the operation of a diode-conduction-state detection unit of the vehicle electric-power conversion apparatus according to Embodiment 2 of the present invention. As represented in FIG. 8, the diode-conduction-state detection unit 212 detects the actual on-timings t1, t5, and t9 and the actual off-timings t6, t10, and t2 of only the upper-arm UH diode, VH diode, and WH diode; at each of these timings, the diode-conduction-state detection unit 212 generates the diode on-timing signal Xon_Timing and the diode off-timing signal Xoff_Timing and inputs them to a timing processing unit 213 and a gate-command monitoring unit 215 described later.

A timing processing unit 213 receives from the diode-conduction-state detection unit 212 each of the diode on-timing signals Xon_Timing and each of the diode off-timing signals Xoff_Timing, and stores the respective values of the rotor-position signals "Position" corresponding to the diode-on timings t1, t5, and t9 and the diode-off timings t6, t10, and t2. After that, the timing processing unit 213 generates, as described above, a switching-element on-timing signal Xon_Timing* at the timing when the on-ensuring time for the switching element has passed from the diode on-timing and a switching-element off-timing signal Xoff_Timing* at the timing that is prior to the rotor-position detection signal "Position" corresponding to a previous diode-off timing that has been stored, by a time which corresponds to the value equivalent to the off-ensuring time for the switching element; the timing processing unit 213 inputs these signals to a gate-command creation Unit 214 and, at the same timing, inputs to a gate-command monitoring unit 215 a monitoring on-timing signal X1on_Timing and a monitoring off-timing signal X1off_Timing.

Additionally, the timing processing unit 213 calculates the timings t7, t11, and t15 and the timings t12, t16, and t8 that are each an electric angle 180° delayed from the diode-on timings t1, t5, and t9, and the diode-off timings t6, t10, and t2, of the upper diodes, obtained as described above, presumes these timings to be the diode-on timings and the diode-off timings of the lower-arm UL diode, VL diode, and WL diode, and stores the values of the rotor-position signals "Position" corresponding to these timings. After that, the timing processing unit 213 generates the switching-element on-timing signal Xon_Timing* at the timing when the on-ensuring time for the switching element has passed from the diode on-timing.

Additionally, the timing processing unit 213 sequentially stores the values θoff(t) of the rotor-position signals "Position" at the presumed diode-off timings, generates the switching-element off-timing signal Xoff_Timing* at the timing when the value of the rotor-position signal "Position" reaches the value θoff (t−1) obtained by subtracting the value corresponding to the off-ensuring time (angle) for the switching element from the value θoff(t) of the rotor-position signal "Position" that has most recently been stored, inputs these signals to a gate-command creation Unit 214, and at the same timing, inputs to the gate-command monitoring unit 215 the monitoring on-timing signal X1on_Timing and the monitoring off-timing signal X1off_Timing.

Based on the switching-element on-timing signal Xon_Timing* and the switching-element off-timing signal Xoff_Timing*, which have been inputted from the timing processing unit 213, and the rotation-position signal "position" from a rotor-position detection unit 211, the gate-command creation Unit 214 creates a gate command signal Xon* for each of the switching elements and outputs the gate command signal Xon*. Other configurations and operations are the same as those of Embodiment 1.

According to a vehicle electric-power conversion apparatus of Embodiment 2, it is not required to actually detect the on-timings and the off-timings of lower-arm UL diode, VL diode, and WL diode; therefore, the configuration of the diode-conduction-state detection unit 212 can be simplified.

Embodiment 3

In a vehicle electric-power conversion apparatus according to Embodiment 3 of the present invention, one of the phases U, V, and W is regarded as the representative phase; the actual diode-on timing and the diode-off timing of the diode connected in parallel with the upper-arm switching element corresponding to the specific phase are detected, so that, based on the detected timings, the on-timings and the off-timings of the upper-arm diodes for other phases are presumed, and the actual diode-on timing and the diode-off timing of the diode connected in parallel with the lower-arm switching element corresponding to the specific phase are detected, so that, based on the detected timings, the on-timings and the off-timings of the lower-arm diodes for other phases are presumed.

Figure 9:
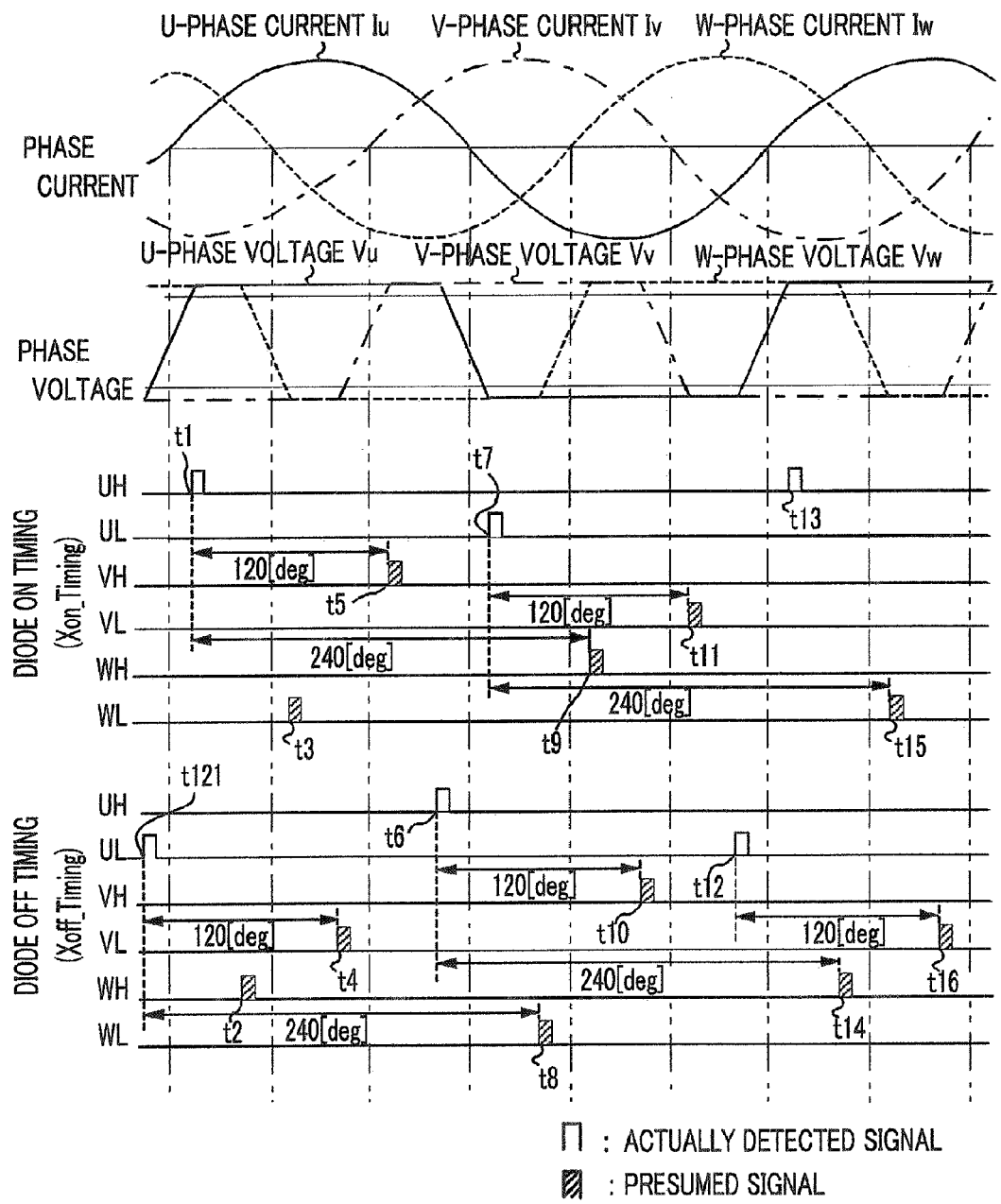
FIG. 9 is a timing chart for explaining the operation of a diode-conduction-state detection unit of a vehicle electric-power conversion apparatus according to Embodiment 3 of the present invention.

FIG. 9 is a timing chart for explaining the operation of a diode-conduction-state detection unit 212 of a vehicle electric-power conversion apparatus according to Embodiment 3 of the present invention. In Embodiment 3, as represented in FIG. 9, the U phase is regarded as the representative phase; the diode-on timings t1 and t7 and the diode-off timings t6 and t121 of UH diode and UL diode, respectively, connected in parallel with UH 223a in the upper arm and UL 224a in the lower arm are actually detected by the diode-conduction-state detection unit 212.

Then, the timing t5 that is delayed by an electric angle of 120° from the detected on-timing t1 of UH diode is presumed to be the diode-on timing of VH diode, and the timing t9 that is delayed by an electric angle of 240° from the detected on-timing t1 of UH diode is presumed to be the diode-on timing of WH diode; additionally, the timing t11 that is delayed by an electric angle of 120° from the detected on-timing t7 of UL diode is presumed to be the diode-on timing of VL diode, and the timing t15 that is delayed by an electric angle of 240° from the detected on-timing t7 of UL diode is presumed to be the diode-on timing of WL diode.

Moreover, the timing t10 that is delayed by an electric angle of 120° from the detected off-timing t6 of UH diode is presumed to be the diode-off timing of VH diode, and the timing t14 that is delayed by an electric angle of 240° from the detected off-timing t6 of UH diode is presumed to be the diode-off timing of WH diode; additionally, the timing t4 that is delayed by an electric angle of 120° from the detected off-timing t121 of UL diode is presumed to be the diode-off timing of VL diode, and the timing t8 that is delayed by an electric angle of 240° from the detected off-timing t121 of UL diode is presumed to be the diode-off timing of WL diode. Other configurations and operations are the same as those of Embodiment 1.

According to a vehicle electric-power conversion apparatus of Embodiment 3, neither detection of the diode-on timings and the diode-off timings of VH diode and WH diode in the upper arm is required, nor actual detection of the diode-on timings and the diode-off timings of VL diode and WL diode in the lower arm is required; therefore, the configuration of the diode-conduction-state detection unit 212 can be simplified.

Embodiment 4

Figure 10:
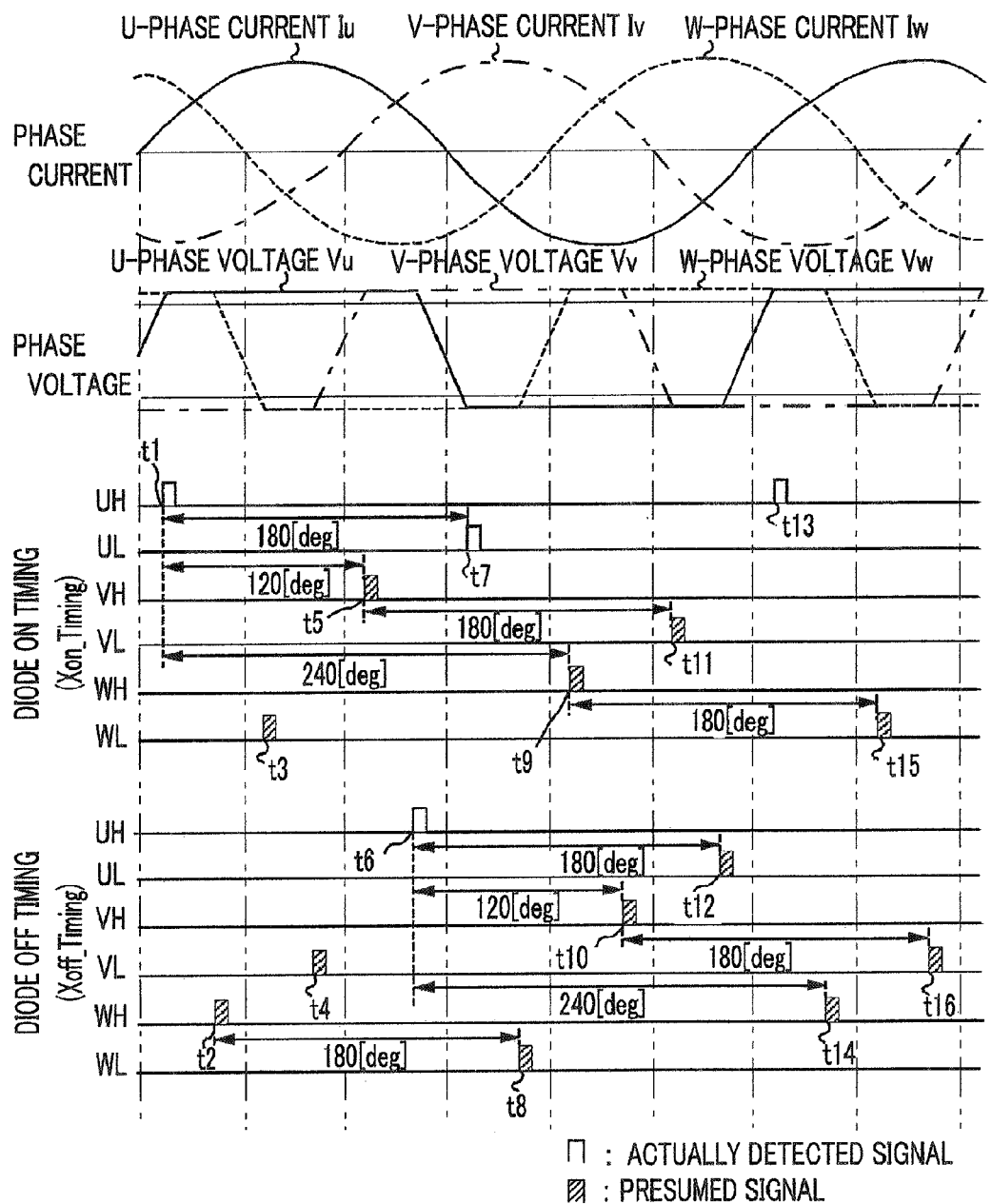
FIG. 10 is a timing chart for explaining the operation of a diode-conduction-state detection unit of a vehicle electric-power conversion apparatus according to Embodiment 4 of the present invention.

FIG. 10 is a timing chart for explaining the operation of a diode-conduction-state detection unit of a vehicle electric-power conversion apparatus according to Embodiment 4 of the present invention. In Embodiment 4, as represented in FIG. 10, the u phase is regarded as the representative phase; only the diode-on timing t1 and the diode-off timing t6 of UH diode connected in parallel with UH 223a in the upper arm are actually detected by a diode-conduction-state detection unit 212.

Then, the timing t5 that is delayed by an electric angle of 120° from the detected on-timing t1 of UH diode is presumed to be the diode-on timing of VH diode, and the timing t9 that is delayed by an electric angle of 240° from the detected on-timing t1 of UH diode is presumed to be the diode-on timing of WH diode; additionally, the timing t7 that is delayed by an electric angle of 180° from the detected on-timing t1 of UH diode is presumed to be the diode-on timing of UL diode, and the timings t11 and t15 that are delayed by an electric angle of 180° from the timings t5 and t9, respectively, are presumed to be the diode-on timings of VL diode and WL diode.

Moreover, the timing t10 that is delayed by an electric angle of 120° from the detected off-timing t6 of UH diode is presumed to be the diode-off timing of VH diode, and the timing t14 that is delayed by an electric angle of 240° from the detected off-timing t6 of UH diode is presumed to be the diode-off timing of WH diode; additionally, the timing t12 that is delayed by an electric angle of 180° from the detected off-timing t6 of UH diode, and the timings t16 and t8 that are delayed by an electric angle of 180° from the timings t10 and t2, respectively, are presumed to be the diode-off timings of UL diode, VL diode and WL diode. Other configurations and operations are the same as those of Embodiment 1.

According to a vehicle electric-power conversion apparatus of Embodiment 4, it is not required to actually detect the diode-on timings and the diode-off timings of all the diodes connected in parallel with the switching elements other than the representative-phase switching element in the upper arm; therefore, the configuration of the diode-conduction-state detection unit 212 can be simplified.

Embodiment 5

Figure 11:
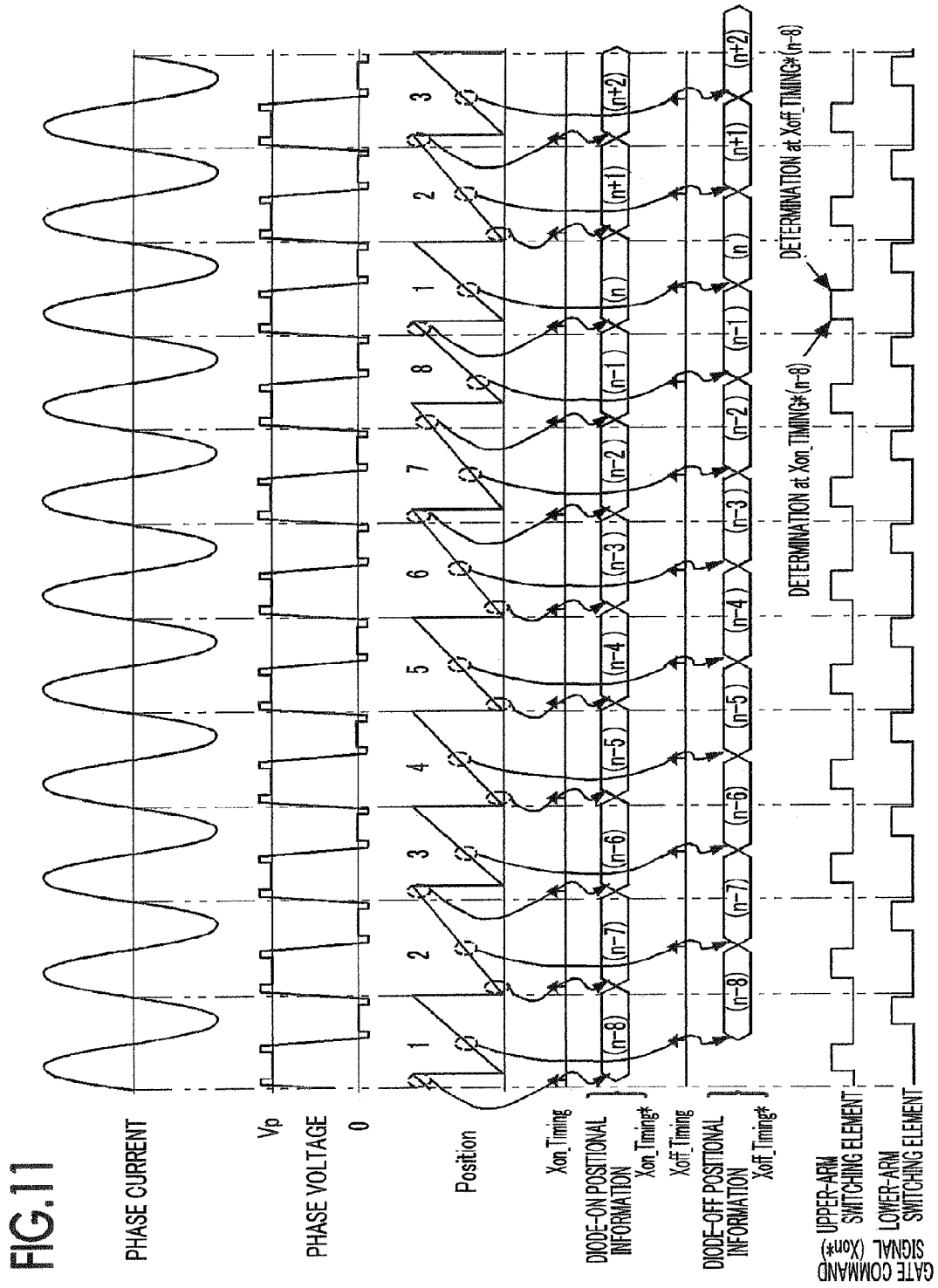
FIG. 11 is a timing chart for explaining the creation of a gate command signal for a vehicle electric-power conversion apparatus according to Embodiment 5 of the present invention.

FIG. 11 is a timing chart for explaining the creation of a gate command signal for a vehicle electric-power conversion apparatus according to Embodiment 5 of the present invention. FIG. 11 represents a state in which, as an example of a rotating electric machine, the number of pole pairs for the rotor is eight, and the method of mounting a rotor-position detection means causes an error in a rotor-position signal "Position" that is the output of a rotor-position detection unit 211.

The error in the rotor-position signal "Position" is repeated every mechanical angle of 360°; therefore, in the case of a motor-generator in which the number of pole pairs for the rotor is eight, the error is equal to the error in the cycle that is eight electric-angle cycles prior to the present cycle. Thus, by performing the control, at the time instant n, of the upper-arm switching element by use of a gate command signal Xon* created from a switching-element on-timing signal Xon_Timing*(n−8) and a switching-element off-timing signal Xoff_Timing*(n−8) that are sampled based on the diode-on timing and the diode-off timing at the time instant (n−8), the effect of the error based on the value of the rotor-position signal "Position" that is the output of the rotor-position detection unit 211 is eliminated.

In a vehicle electric-power conversion apparatus according to Embodiment 5, a gate-command creation Unit 214 creates the gate command signal Xon* from the switching-element on-timing signal Xon_Timing*(n−8) and the switching-element off-timing signal Xoff_Timing*(n−8) at the time instant (n−8) and feeds the gate command signal Xon* to the upper-arm switching element at the time instant n. In addition, other configurations are the same as those of Embodiment 1.

According to a vehicle electric-power conversion apparatus of Embodiment 5, high-reliability control can be performed without being affected by the error in the rotor-position signal "Position".

Embodiment 6

Figure 12:
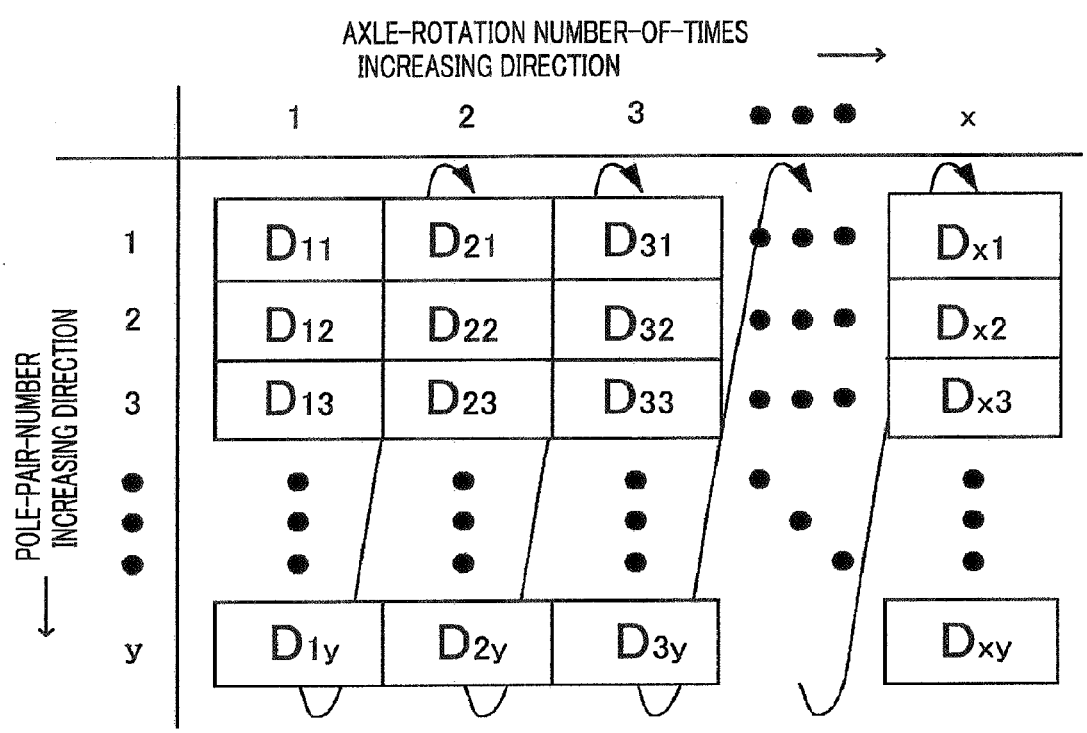
FIG. 12 is an explanatory diagram for explaining a vehicle electric-power conversion apparatus according to Embodiment 6 of the present invention.

FIG. 12 is an explanatory diagram for explaining a vehicle electric-power conversion apparatus according to Embodiment 6 of the present invention; FIG. 12 illustrates a historical matrix of the diode-on timings and the diode-off timings. In FIG. 12, "y" tables, "y" corresponding to the number of pole pairs for a rotating electric machine, are illustrated in the longitudinal (column) direction, and "x" tables, "x" corresponding to the number of histories of the axle-rotation number of the rotating electric machine, are illustrated in the lateral (row) direction.

As illustrated in FIG. 12, pairs of the diode-on timings and the diode-off timings are stored in a memory from D11, D12, to D13 in that order, every diode-on timing and every diode-off timing, in accordance with the number of rotor pole pairs for a rotating electric machine; after the y-th pair of the diode-on timing and the diode-off timing is stored in D1y ("y" is the number of pole pairs for the rotating electric machine), the subject table field is shifted in the lateral direction and pairs of the diode-on timings and the diode-off timings are sequentially stored in the longitudinal direction, from D21, D22, to D23 in that order; after x×y pieces of data are stored, the subject table field returns to D11, and the storage of data is repeated thereafter in a similar manner.

In addition, the number of the axle-rotation-number histories "x" may be selected in accordance with the system restriction such as memory to be applied or calculation performance, and the pole-pair-number history "y" may not necessarily be required to be the number of pole pairs, but may be a submultiple of the number of pole pairs. For example, in the case where, as the rotor-position detection means, a resolver is utilized, the number of resolver poles and the number of poles for a rotating electric machine do not necessarily coincide with each other. In this situation, eccentricity in resolver mounting may affect the result of detection of the diode-on timing and the diode-off timing; therefore, as "y", the number equal to the common divisor between the respective pole-pair numbers of the rotating electric machine and the resolver may be selected so as to eliminate the effect.

Next, a method of calculating diode-on timings and diode-off timings by use of data in the historical matrix will be described. The (x×y) data pieces selected as described above would approximately coincide with one another, originally without any deviation; however, as described already, they do not coincide with one another, due to various factors as described above. Thus, the maximal value, the minimal value, and the average value of the (x×y) data pieces are calculated in a known manner. Because the historical matrix includes the diode-on timings and the diode-off timings, the respective maximal values and the respective minimal values, and the respective average values of the diode-on timings and the diode-off timings that make pairs are calculated.

Additionally, an angle includes a periodic-function element, i.e., an angle passes through "zero"; therefore, based on the maximal value and the minimal value of the diode-on timing and the diode-off timing, respectively, and the fact whether or not the angle has passed through "zero", the diode-on timing and the diode-off timing at which the diode conduction state becomes minimal are obtained. On this occasion, when the angle does not pass through "zero", the maximal-value diode-on timing and the minimal-value diode-off timing are the timings at which the diode conduction state is minimal; however, when the angle passes through "zero", attention is required because what has been described above does not happen.

As one of modes of Embodiment 6, based on the calculated diode-on timing and the diode-off timing at which the diode conduction state is minimal, the timing between the on-ensuring angle (time) and the off-ensuring angle (time) represented in FIG. 12 is regarded as the diode-on timing.

As another mode of Embodiment 6, based on the average value of the calculated diode-on timing and the diode-off timing, the timing between the on-ensuring angle (time) and the off-ensuring angle (time) represented in FIG. 12 is regarded as the diode-energizing timing.

Moreover, by use of historical matrix, illustrated in FIG. 12, of the diode-on timings and the diode-off timings, a monitoring method can be realized in which the present data is compared with the consecutive historical data or the average value, the maximal value, or the minimal value in the lateral direction (axle-rotation number-of-times increasing direction), and when the difference exceeds a threshold value (e.g., ±5°), the synchronous rectification is prohibited.

Embodiment 7

Figure 13:
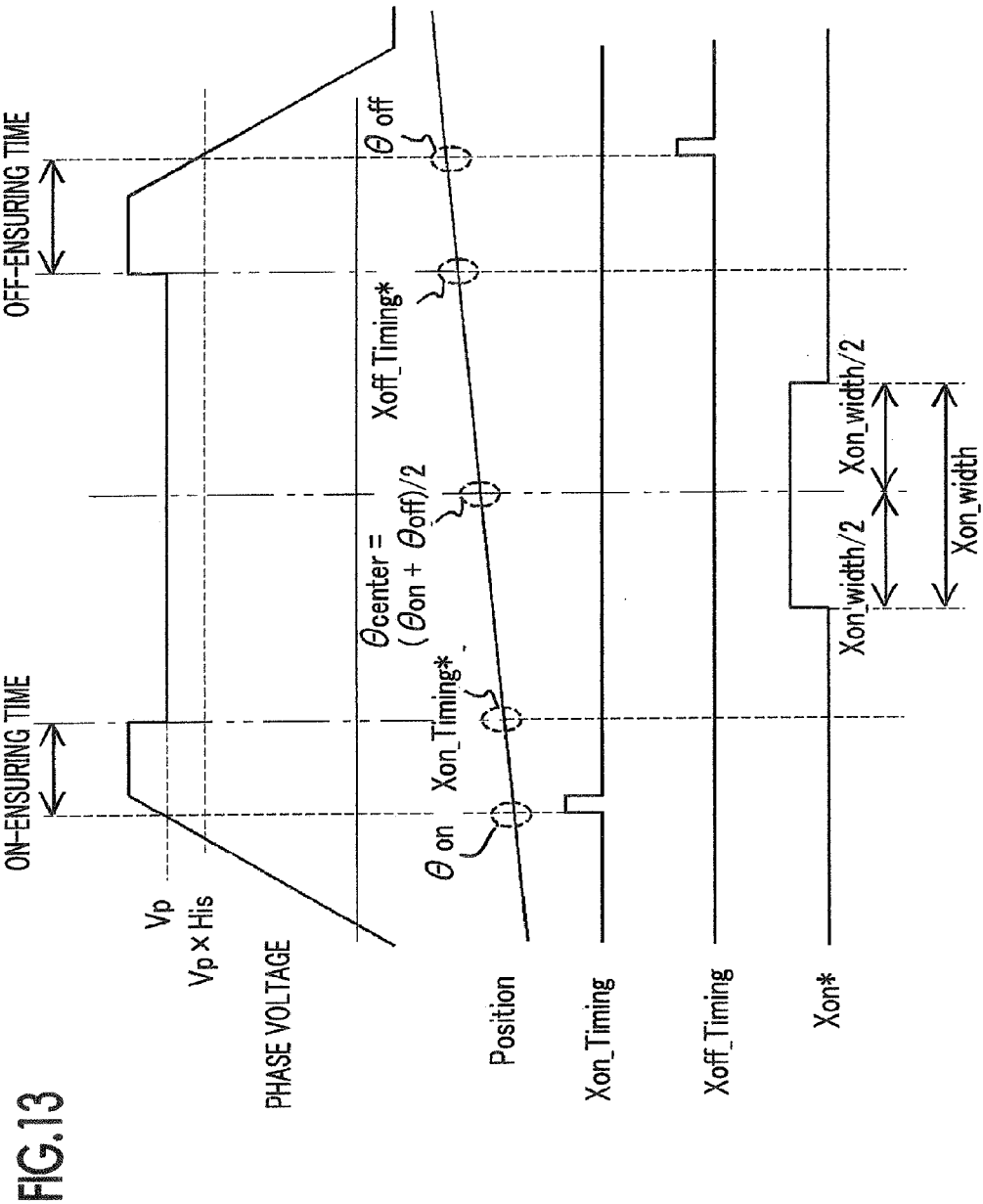
FIG. 13 is a timing chart representing a control timing for a switching element in a vehicle electric-power conversion apparatus related to Embodiment 7 of the present invention.

FIG. 13 is a timing chart representing control timings for a switching element in a vehicle electric-power conversion apparatus related to Embodiment 7 of the present invention. In FIG. 13, a gate command signal Xon* gradually varies a conduction angle Xon_Width between a switching-element on-timing signal Xon_Timing* and a switching-element off-timing signal Xoff_Timing*, with respect to θcenter that is the middle point between a diode on-timing signal Xon_Timing and a diode-off timing signal Xoff_Timing.

Embodiment 8

Figure 14:
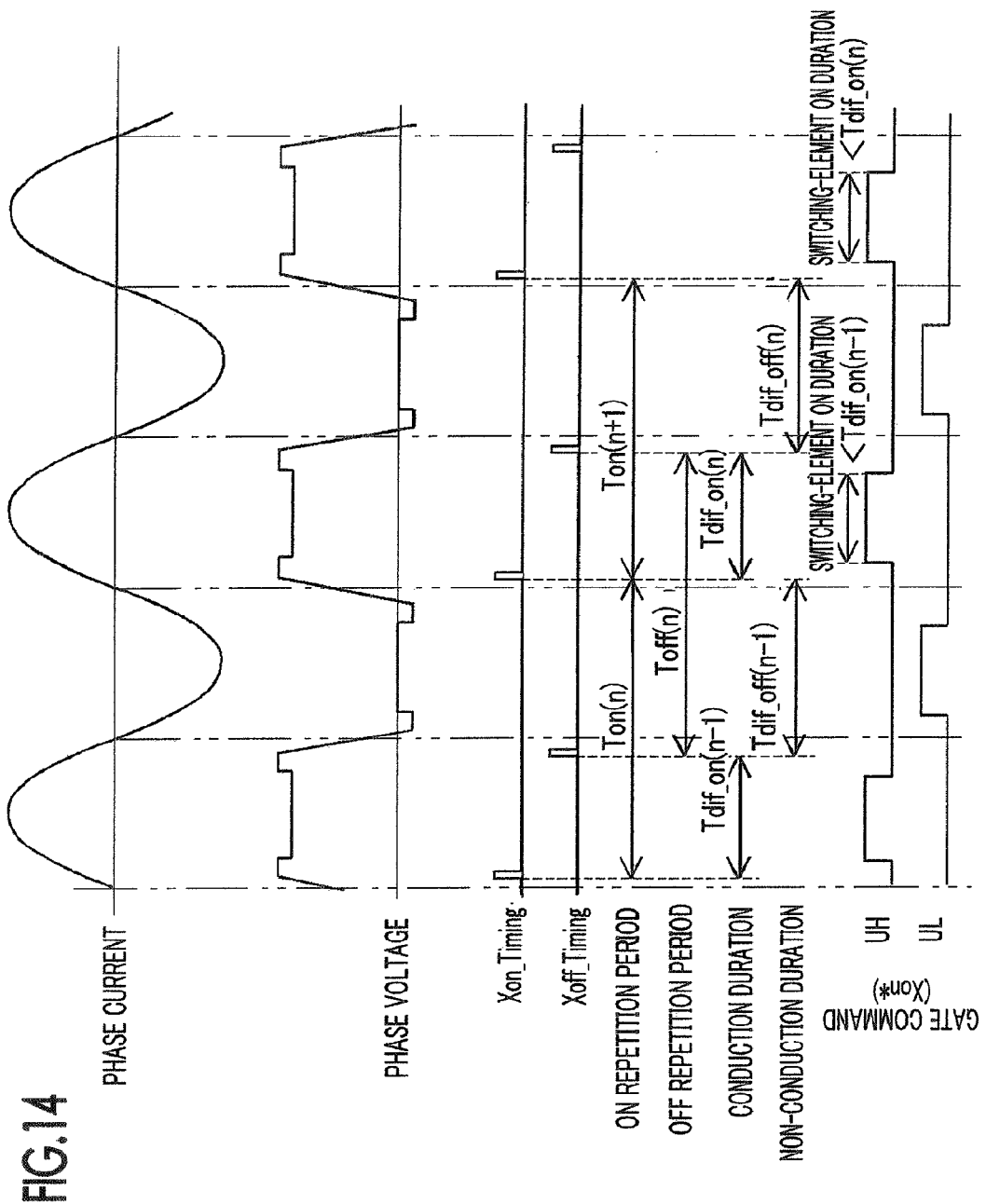
FIG. 14 is a timing chart representing a method of monitoring a gate command signal for a vehicle electric-power conversion apparatus according to Embodiment 8 of the present invention.

FIG. 14 is a timing chart representing a method of monitoring a gate command signal for a vehicle electric-power conversion apparatus according to Embodiment 8 of the present invention. In Embodiment 8, a fail-safe mechanism is established based on the temporal periodicity of a diode-on timing Xon_timing and a diode-off timing Xoff_timing from a diode-conduction-state detection unit 212, a diode conduction duration, and a diode non-conduction duration.

That is to say, as represented in FIG. 14, control is performed in such a way that the maximal value of a switching-element on duration Tdif_on(n−1) of the switching element connected in parallel with a diode is shorter than a diode conduction duration Tdif_on(n). As a result, provision is made for the switching element to be off-controlled even when the rotor position is not at the mechanical position to off-control the switching element.

Various modifications and alterations of this invention will be apparent to those skilled in the art without departing from the scope and spirit of this invention, and it should be understood that this is not limited to the illustrative embodiments set forth herein.

What is claimed is:

1. A vehicle electric-power conversion apparatus comprising:
    an electric-power conversion unit, having a plurality of switching elements each connected between an armature winding of a rotating electric machine equipped in a vehicle and a DC load and a plurality of diodes each connected in parallel with a corresponding switching element, for performing electric-power conversion between the rotating electric machine and the DC load, by means of switching operation of the plurality of switching elements;
    a diode-conduction-state detection unit for detecting diode-on timings and diode-off timings corresponding to conduction states of at least one of the plurality of diodes in the case where the rotating electric machine is in electric-power generating operation and the plurality of switching elements are off;
    a gate-command creation Unit for creating gate command signals for the plurality of switching elements, based on the diode-on timings and the diode-off timings detected by the diode-conduction-state detection unit, and for feeding the gate command signals to the plurality of switching elements; and
    the electric-power conversion being performed by means of switching operation, of the plurality of switching elements, in accordance with the gate command signals.

2. The vehicle electric-power conversion apparatus according to claim 1, wherein the electric-power conversion unit includes a bridge circuit whose AC-side terminals are connected to respective multi-phase armature windings of corresponding phases and whose DC-side terminals are connected to the DC load; the plurality of switching elements and the plurality of diodes each connected in parallel with the corresponding switching element configure the upper arm and the lower arm, respectively, of the bridge circuit; and the diode-conduction-state detection unit detects the diode-on timing and the diode-off timing of each of the plurality of diodes connected in parallel with all the corresponding switching elements.

3. The vehicle electric-power conversion apparatus according to claim 2, wherein the diode-conduction-state detection unit detects, as the diode-on timing, the timing when the phase voltage value of the phase to which the diode, connected in parallel with the lower-arm switching element, whose diode-on timing is detected corresponds is the same as or smaller than the voltage value of the negative-polarity terminal of the DC load and the same as or larger than the voltage value obtained by subtracting the forward voltage value of the diode from the negative-polarity-terminal voltage value and the forward.

4. The vehicle electric-power conversion apparatus according to claim 2, wherein the diode-conduction-state detection unit detects, as the diode-off timing, the timing when the phase voltage value of the phase to which the diode, connected in parallel with the lower-arm switching element, whose diode-off timing is detected corresponds is smaller than the voltage value of the negative-polarity terminal of the DC load.

5. The vehicle electric-power conversion apparatus according to claim 1, wherein the electric-power conversion unit includes a bridge circuit whose AC-side terminals are connected to respective multi-phase armature windings of corresponding phases and whose DC-side terminals are connected to the DC load; the plurality of switching elements and the plurality of diodes each connected in parallel with the corresponding switching element configure the upper arm and the lower arm, respectively, of the bridge circuit; and the diode-conduction-state detection unit detects the diode-on timing and the diode-off timing of each of the plurality of diodes connected in parallel with the corresponding switching elements that are in the upper arm and correspond to the respective phases.

6. The vehicle electric-power conversion apparatus according to claim 5, wherein the diode-on timing and the diode-off timing of each of the diodes other than the one or more diodes whose diode-on timings and diode-off timings have been detected are presumed based on the detected diode-on timings and diode-off timings.

7. The vehicle electric-power conversion apparatus according to claim 5, wherein the diode-conduction-state detection unit detects, as the diode-on timing, the timing when the phase voltage value of the phase to which the diode, connected in parallel with the upper-arm switching element, whose diode-on timing is detected corresponds is the same as or larger than the voltage value of the positive-polarity terminal of the DC load and the same as or smaller than the voltage value that is the sum of the positive-polarity-terminal voltage value and the forward voltage value of the diode.

8. The vehicle electric-power conversion apparatus according to claim 5, wherein the diode-conduction-state detection unit detects, as the diode-off timing, the timing when the phase voltage value of the phase to which the diode, connected in parallel with the upper-arm switching element, whose diode-off timing is detected corresponds is smaller than the voltage value of the positive-polarity terminal of the DC load.

9. The vehicle electric-power conversion apparatus according to claim 1, wherein the electric-power conversion unit includes a bridge circuit whose AC-side terminals are connected to respective multi-phase armature windings of corresponding phases and whose DC-side terminals are connected to the DC load; the plurality of switching elements and the plurality of diodes each connected in parallel with the corresponding switching element configure the upper arm and the lower arm, respectively, of the bridge circuit; and the plurality of switching elements includes upper-arm switching elements and lower-arm switching elements that are connected to the multi-phase armature windings of corresponding phases; and the diode-conduction-state detection unit detects the diode-on timing and the diode-off timing of each of the diodes connected in parallel with the corresponding upper-arm and lower-arm switching elements that are connected to the multi-phase armature winding of a specific phase.

10. The vehicle electric-power conversion apparatus according to claim 1, wherein the electric-power conversion unit includes a bridge circuit whose AC-side terminals are connected to respective multi-phase armature windings of corresponding phases and whose DC-side terminals are connected to the DC load; the plurality of switching elements and the plurality of diodes each connected in parallel with the corresponding switching element configure the upper arm and the lower arm, respectively, of the bridge circuit; and the diode-conduction-state detection unit detects the diode-on timing and the diode-off timing of the diode connected in parallel with the upper-arm switching element that are connected to the multi-phase armature winding of a specific phase.

11. The vehicle electric-power conversion apparatus according to claim 1, wherein a gate-command monitoring unit for monitoring the creation timings of the gate command signals for at least one of the detected diode-on timing and diode-off timing is provided.

12. The vehicle electric-power conversion apparatus according to claim 11, wherein the gate-command monitoring unit monitors at least one of the diode-on timing and the diode-off timing, and when detecting the abnormality in the timings, prohibits the switching operation of the switching element.

13. The vehicle electric-power conversion apparatus according to claim 11, wherein the gate-command monitoring unit monitors a first relationship in which the diode-on timing exists before the gate command signal and a second relationship in which the diode-off timing exists after the gate command signal, and when at least one of the relationships are negated, prohibits the switching operation of the switching element.

14. A vehicle electric-power conversion apparatus comprising:
an electric-power conversion unit, having a plurality of switching elements each connected between an armature winding of a rotating electric machine equipped in a vehicle and a DC load and a plurality of diodes each connected in parallel with a corresponding switching element, for performing electric-power conversion between the rotating electric machine and the DC load, by means of switching operation of the plurality of switching elements;
a diode-conduction-state detection unit for detecting diode-on timings and diode-off timings corresponding to conduction states of at least one of the plurality of diodes in the case where the rotating electric machine is in electric-power generating operation and the plurality of switching elements are off;
a rotor-position detection unit for generating a rotor-position signal corresponding to the position of the rotor of the rotating electric machine;
a timing processing unit for sequentially storing the values of the rotor-position signals each corresponding to the detected diode-on and the detected diode-off timing and for calculating switching-element-on timings and switching-element-off timings for the plurality of switching elements;
a gate-command creation Unit for creating gate command signals for the plurality of switching elements, based on the switching-element-on timings and the switching-element-off timings calculated by the timing processing unit, and for feeding the gate command signals to the plurality of switching elements; and
the electric-power conversion being performed by means of switching operation, of the plurality of switching elements, in accordance with the gate command signals.

15. The vehicle electric-power conversion apparatus according to claim 14, wherein the timing processing unit presumes the conduction state of the diode, based on the values, of the rotor-position signals corresponding to the diode-on timings and the diode-off timings, which have previously been stored in N times in series, N being a natural number based on the number of pole pairs for the rotating electric machine, so as to calculate the present diode-on timing and the diode-off timing.

16. The vehicle electric-power conversion apparatus according to claim 14, wherein the timing processing unit presumes the conduction state of the diode at a timing at which no variation in the stored values of rotor-position signals affects the presumption.

17. The vehicle electric-power conversion apparatus according to claim 14, wherein the timing processing unit presumes the conduction state of the diode, based on the average value, of the rotor positions corresponding to the diode-on timings and the diode-off timings, which have previously been stored in N times in series, N being a natural number, so as to calculate the present diode-on timing and the diode-off timing.

18. The vehicle electric-power conversion apparatus according to claim 14, wherein the gate-command creation unit calculates the middle position of diode conduction duration, based on the diode-on timing and the diode-off timing that have been calculated by the timing processing unit, and creates the gate command signal so as to vary a range in which the switching element becomes conductive, with respect to the calculated middle position.

* * * * *